March 27, 1951     H. F. McHOSE     2,546,764
NAVIGATIONAL INSTRUMENT
Filed Nov. 14, 1949     2 Sheets-Sheet 1
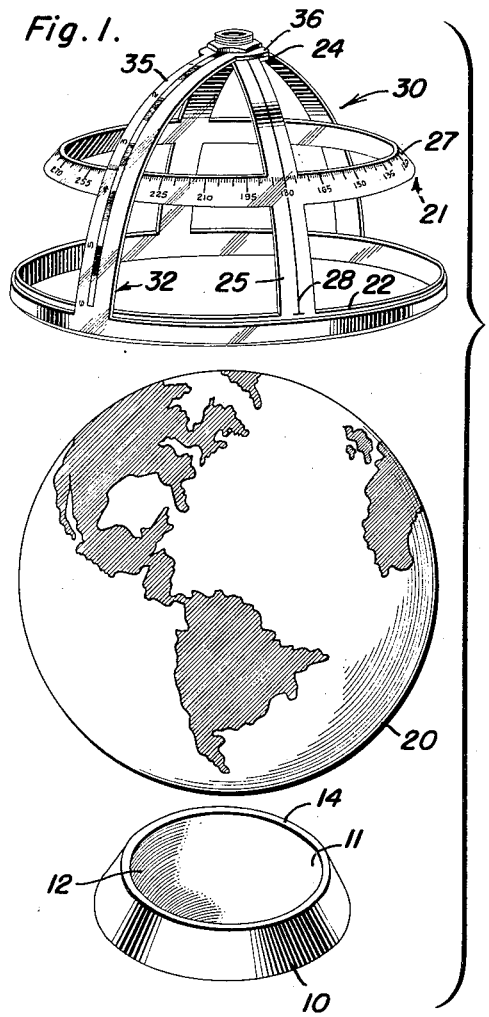
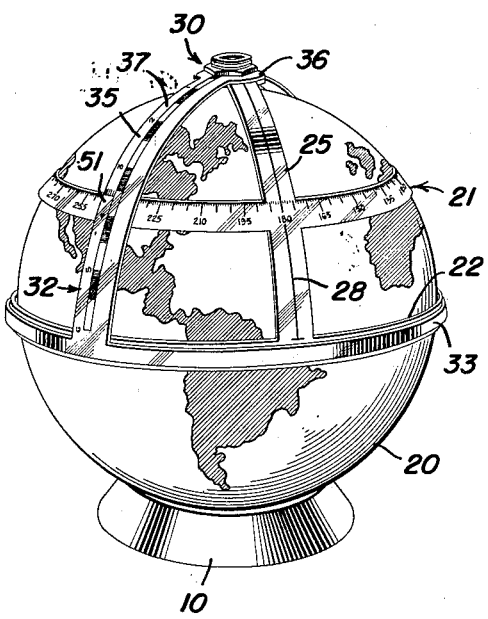
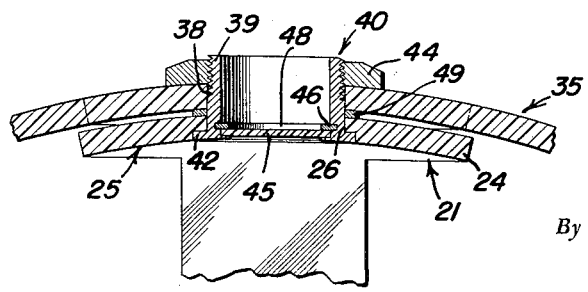
Inventor
Harold F. McHose
By *Clarence A. O'Brien and Harvey B. Jacobson*
Attorneys March 27, 1951

H. F. McHOSE 2,546,764

NAVIGATIONAL INSTRUMENT

Filed Nov. 14, 1949

Inventor

Harold F. McHose

By *Clarence A. O'Brien and Harvey B. Jacobson*
Attorneys

Patented Mar. 27, 1951

2,546,764

UNITED STATES PATENT OFFICE 2,546,764

NAVIGATIONAL INSTRUMENT

Harold F. McHose, Musselshell, Mont.

Application November 14, 1949, Serial No. 127,005

4 Claims. (Cl. 33—1)

This invention relates to navigational instruments, such as used on ships and especially on airplanes, and it has for its main and chief purpose to provide an instrument furnishing direct readings for data which are customarily only determined by carrying out trigonometric calculations or by manipulating a number of precision instruments.

Another object of the invention consists in providing an instrument of the above description which can be handled and manipulated without difficulty and without the risk of error by persons which need not be specially trained or skilled in the art of navigation.

When determining flight data for long distances, for instance, the sphericity of the earth entails either plotting on a chart or the making of complex trigonometric calculations in order to translate data which have been determined on a plane, such as a map, into those data which have actually to be followed during flight. The determination of the true course between points which can, on account of their distance, no longer be considered as joined by a straight line, is one of the examples. The instruments which have been proposed for such translation of data are almost invariably of the type requiring an expert or a specially skilled operator.

In order to reduce the effort necessary for the translation of data, instruments using globes as a basis for the determination of data have been proposed. But instruments of this type are usually not only bulky but are difficult to handle and have to use precision mounting either of the globe or of the parts movable thereon which are of an involved kind in order to produce movement in a plurality of directions.

It is therefore an object of the invention to provide a navigational instrument using a globe the mechanical equipment of which is reduced to a minimum and which can be handled without any mechanical or other difficulty.

According to the invention the instrument consists of three mechanically independent units, supported merely by arranging them one on top of the other, one of said units being a globe placed into a suitable holder or base which forms the second unit, said globe being held merely by gravity and friction. Therefore, the adjustment of the globe which need be only an approximate adjustment which is not critical does not affect the reading and can be made by hand without difficulty. This adjustment merely consists in locating on the globe one definite point and in bringing this point approximately into a predetermined top position.

The third unit of the instrument consists in a meridian guide provided with a protractor adapted to encircle the globe and to ride thereon which member is rotatably joined to an alidade member provided with a great circle line and a distance graduation. The connection between the two last named members is effected by means of a joining pivot which is also provided with means for locating its center exactly on one point of the globe.

This arrangement of three loose units makes possible to dispense entirely with the involved mounting, permitting either the globe or the units on the globe to be moved in a plurality of directions, and therefore reduces the equipment materially especially as no means for bringing the alidade, for instance, into its proper position on the globe need be provided. Notwithstanding this simplification the manipulation to be performed by the operator is of extreme simplicity, as the adjustment bringing the alidade and the meridian guide to their position consists merely in a visual alignment requiring attention, but not requiring much training.

The operation to be carried out with the instrument according to the invention is thus of extreme simplicity, while furnishing such necessary data as the azimuth of the true course which were unobtainable without precision instruments or without complex calculations according to the methods hitherto used.

Further features of the invention and further objects will be apparent from the following detailed specification.

The invention is illustrated in the accompanying drawing showing one embodiment thereof. It is however to be understood that the embodiment shown in the drawing represents only an example selected in order to explain the principle of the invention and the best mode of applying said principle. No survey of the possible embodiments of the invention is given in the specification and modifications of the example which has been illustrated are therefore not necessarily departures from the essence of the invention.

In the drawings:

Figure 1 is an exploded perspective view of the instrument showing the three units constituting the instrument one above the other.

Figure 2 is a perspective view of the instrument when assembled.

Figure 5 is an elevational sectional view of the pivot arrangement by means of which the members of the protractor assembly are joined, the section being taken along a plane indicated at 5—5 in Figure 3.

Figure 3:
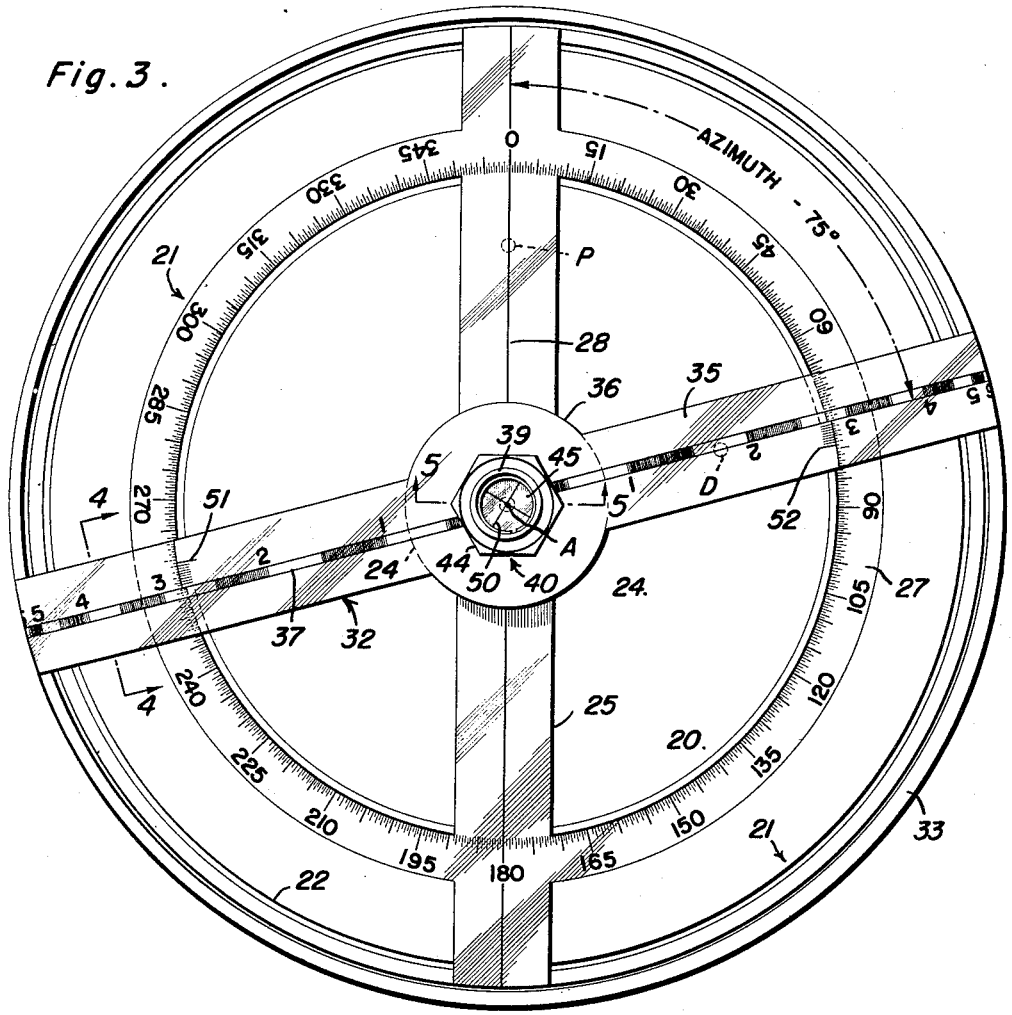
Figure 3 is a top plan view of the instrument on an enlarged scale illustrating especially the protractor assembly and the alidade.
Figure 4:
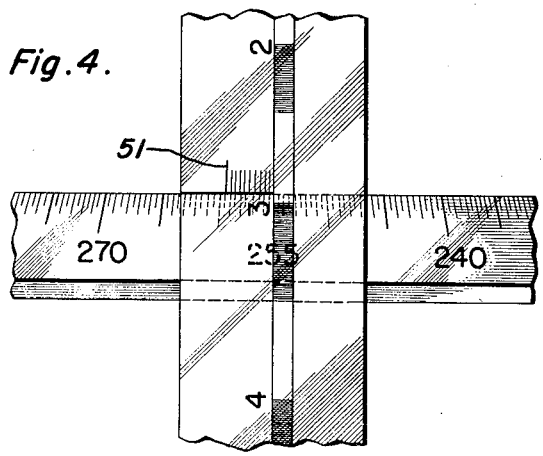
Figure 4 is an elevational view of a portion of the protractor unit showing how this unit cooperates with the alidade and also showing the location and the use of a vernier, the view being taken from a plane which is indicated in Figure 3 at 4—4.

The instrument, according to the invention, essentially comprises three units or main elements 10, 20, 30, the lowermost unit 10 of which serving as a supporting base.

This supporting base 10 may be made of any suitable material such as plastics or wood. Its shape is not material, but the upper edge 14 which forms a supporting edge for the globe must be circular.

In the example shown the base is frusto-conical and has an inner wall 12 which is spherical, the radius of the sphere being identical with that of the globe 20. The globe in this case may rest on the bowl shaped spherical surface 12 instead of resting on the edge 14, thus reducing abrasions of the surface of the globe 20 along the edge 14.

The globe 20 is made of any suitable material such as plastics, pressed paper or the like and its construction need not be described. It is covered by a map of the world as usual. The size of the globe must be chosen in accordance with the precision which it is desired to obtain and it is only limited by practical considerations.

The finder assembly 30 which cooperates with the globe also consists of three main elements, two of which surround the upper half of the globe while the third element consists of a special pivot member joining the aforesaid two elements. Directly seated on the globe 20 is a protractor assembly 21 which comprises a circular band member 22 of an inner diameter substantially equal to and only slightly larger than that of the globe 20 which therefore encircles the globe substantially along a great circle. A further band member 25 is fixed to or is made in one piece with the aforesaid member 22 and is arranged at a right spherical angle thereto, this member forming the meridian guide. The meridian guide therefore joins two diametrically opposite points of the circular member 22.

All the band members may be curved along a spherical surface having its center in the center of said circular member 25 which is coincident with the center of the globe 20 when the said member is placed on the globe.

The meridian guide thus runs along a great circle of the globe 20 and covers an arc of 180°. In its middle portion the guide member is provided with an enlargement 24 having an opening 26 for a purpose described below.

The meridian guide 25 is preferably provided with a line 28 which runs along a great circle of the globe which line is engraved or otherwise clearly marked on the guide member.

At a convenient distance from the circular member 22, say at about one-third or one-half of the height of said protractor assembly a circular protractor member 27 is arranged which is preferably also fixed to or made in one piece with the meridian guide member 25. This protractor member has also the form of a circular band running around one of the circles of the globe and it may be provided with a curved inner surface parallel to that of the globe.

The protractor band is provided with a fine graduation running through the full 360° along its inner edge which in actual use, when the assembly is placed on the globe, is its upper edge. Preferably the smallest subdivision is at least a fraction of a degree.

The entire protractor assembly 21 is preferably made of a fully transparent plastic with the graduations and also the meridian line 28 on member 25 engraved thereon or pressed into it.

Over the protractor assembly 21 and closely encircling it an alidade member 32 is placed which consists of a circular band 33 encircling the circular strip 22 and further consisting of the alidade member proper 35 which is fixed to or made in one piece with the circular band and joins two diametrically opposite points of the same. It therefore covers an arc of 180°. In the middle of said arc this member is also provided with an enlargement 36 having a central opening 38.

The alidade member 32, like the protractor member, is made of a fully transparent plastic in order that the graduation of the protractor and also the globe may be observed through the said member. On the semi-circular alidade member 35 the great circle is marked by a line along which a scale graduated in miles may be arranged, preferably by engraving or printing or in some other suitable manner.

The diameters of the inner surfaces of all the band like members forming the protractor and the alidade assembly should be as nearly as possible those of the globe 20, only such allowances being made as are necessary for sufficient clearance between the alidade assembly, the protractor assembly and the globe so as to permit easy independent movement of all parts when seated.

The alidade assembly 32 and the protractor assembly 21 are joined by a hollow pivot member 40 which consists of a tube 39 provided at one end with screw threads and on the other end with a flange 42 projecting outwardly and also projecting inwardly to a certain extent. This pivot fits more or less exactly into the openings 26 and 38 of the enlargements 24 and 36. The flange 42 is preferably countersunk as far as possible into the plastic of the enlargement 24. The tube 39 after having been mounted to hold the alidade assembly and protractor assembly together while permitting their relative movement around the pivot axis is held by means of a nut 44 engaging the threaded portion of the tubular member 39. A small washer 49 may be inserted between the two members 21 and 35.

The inwardly projecting portion of the flange 42 supports a ring or a glass plate or glass lens 45 with a cross 50. Preferably a magnifying glass may be carried or held in place by an elastic spring 46 held in a groove 48 of the tubular pivot member 39.

In order to make protractor readings as accurate as possible two verniers 51 and 52 may be placed on the alidade member 35 at the places where the inner graduation bearing edge of the protractor member 27 runs along or intersects the said member 35. The vernier scales allow to read the graduation scale of said protractor with the highest obtainable precision.

Two verniers are provided to cover readings between zero degree and 180° as well as readings between 180° and 360°.

The pivot must be so adjusted that it permits relative movement of the protractor member 21 with respect to the alidade member 32 while holding these members firmly.

As has been above explained the principal use of the instrument consists in the determination of the angle (azimuth) of the direction of the true course line relatively to a selected meridian which serves as a basis and for the determination of the great circle distance between two spots.

In order to use the instrument for the above named purpose the base 10 is placed on a supporting surface and the globe 20 is placed on the base 10. Then the globe is adjusted or rotated by the operator until the point on the globe which forms the starting point is brought to the top. This point is designated by A in Figure 3. Then the finder assembly 30 is placed on top of the globe and is so adjusted by means of the cross 50 in the tubular pivot 40 that the center of the pivot 40 is coincident with the starting point A. This adjustment may be seen in Figure 3.

With this adjustment either the North or the South pole—depending on the location of the starting point on the globe—will be in the upper hemisphere of the globe 20. The pole is marked with P in Figure 3. The protractor assembly 21 is now rotated around the pivot until the median guide line 28 of the meridian guide 25 passes through the pole P in the upper globe hemisphere. This adjustment is shown in Figure 3.

Now the alidade assembly is rotated until its great circle line 37 along which the scale of miles is arranged is over the point of destination which is marked D in Figure 3.

The azimuth of the true course line can now be read on the protractor 27 by means of one of the verniers 51 or 52. Courses from zero degree to 180° are read on vernier 52 and courses from 180° to 360° are read on vernier 51. The distance between the starting point A and the point of destination D can now be read directly on the scale.

It will thus be seen that no plotting on a chart has to be carried out and no trigonometrical operations of any kind are necessary in order to obtain the above named data. In actual operation, since the azimuth of the great circle changes during the flight it is advisable to check on the data or to make a new reading from time to time, as soon as readily identifiable points are reached. The findings on these points will serve to check upon the data previously obtained or will serve to obtain a re-direction or readjustment.

While the general arrangement and relationship of the unit is essential, it will be readily understood that the specific construction of the parts of the unit is unessential and has been described merely by way of example and that changes of unessential nature will not in any way affect the essence of the invention.

Having described the invention, what is claimed as new is:

1. A navigational instrument comprising three separate units, adapted to be placed one on top of the other, one of said units being a globe, and a further unit being a base member with a circular edge encircling a hollow space, adapted to support the lower portion of said globe, and a further unit consisting of combined alidade and protractor assemblies, adapted to be placed on said globe and to be supported thereon, said assemblies consisting each of a circular band of a diameter substantially equal to that of the globe and of a semicircular band joining two diametrically opposite points of said circular band, the protractor assembly being in addition provided with a circular graduated member of a diameter smaller than one of the great circles on the globe and arranged in substantial parallelism to the circular bands, said protractor assembly and alidade assembly being joined by a hollow pivot adapted for alignment of its axis with a selected point on the globe.

2. A navigational instrument comprising three separate units, adapted to be placed one on top of the other, one of said units being a globe, and a further unit being a base member with a circular edge encircling a hollow space, adapted to support the lower portion of said globe, and another unit being combined alidade and protractor assemblies, adapted to be placed on said globe and to be supported thereon, said protractor assembly including a circular member of a diameter substantially equal to the diameter of a great circle of the globe, and a semi-circular member joining diametrically opposite points of the circular member, of a diameter substantially equal to the diameter of a great circle of the glove, said semicircular member being provided with a meridian line and forming a meridian guide, and a circular protractor member of a diameter smaller than that of a great circle of the globe and substantially parallel to the circular member, carrying graduations along one of its edges, and said alidade assembly consisting of a circular member, encircling the circular member of the protractor assembly, and of a semi-circular member joining diametrically opposite points of the circular member, of a diameter substantially equal to that of a great circle of the globe, said last named semi-circular member carrying a great circle indicating line and distance graduations, said protractor assembly and alidade assembly being joined by a hollow pivot adapted for alignment of its axis with a selected point on the globe.

3. A navigational instrument comprising three separate units, adapted to be placed one on top of the other, one of said units being a globe, a further unit being a base member with a circular edge encircling a hollow space, adapted to support the lower portion of said globe, and another unit being combined alidade and protractor assemblies, adapted to be placed on said globe and to be supported thereon, said protractor assembly including a circular member of a diameter substantially equal to the diameter of a great circle of the globe, and a semi-circular member joining diametrically opposite points of the circular member, of a diameter substantially equal to the diameter of a great circle of the globe, said semi-circular member being provided with a meridian line and forming a meridian guide, and a circular protractor member of a diameter smaller than the diameter of a great circle of the globe and substantially parallel to the circular member, carrying graduations along one of its edges, and said alidade assembly consisting of a circular member, encircling the circular member of the protractor assembly, and of a semi-circular member joining diametrically opposite points of the circular member, of a diameter substantially equal to that of a great circle of the globe, said last named semi-circular member carrying a great circle indicating line and distance graduations, a tubular pivot joining said protractor assembly and alidade assembly at the intersection of the two semi-circular members of the said assemblies, said tubular pivot being provided with a cross marking the axis of the pivot, said pivot holding the protractor and alidade assembly for a relative rotational movement around the axis of the pivot.

4. A navigational instrument as claimed in claim 2, wherein the semi-circular member of the alidade member is provided with a vernier at the point of intersection of the circular protractor member with the great circle line on the said semi-circular member.

HAROLD F. McHOSE.

REFERENCES CITED

The following references are of record in the file of this patent:

UNITED STATES PATENTS

| Number | Name | Date |
|---|---|---|
| 247,811 | Eichens | Oct. 4, 1881 |
| 1,949,403 | Ashlock | Mar. 6, 1934 |
| 2,151,601 | Johnson | Mar. 21, 1939 |
| 2,183,765 | Coleman | Dec. 19, 1939 |
| 2,403,920 | Hagner | July 16, 1946 |
| 2,405,418 | Fukal | Aug. 6, 1946 |
| 2,408,651 | Kiehl | Oct. 1, 1946 |
| 2,483,228 | Palmer | Sept. 27, 1949 |

FOREIGN PATENTS

| Number | Country | Date |
|---|---|---|
| 2,457 | Great Britain | 1882 |